United States Patent [19]

Meddaugh et al.

[11] Patent Number: 5,523,556
[45] Date of Patent: Jun. 4, 1996

[54] APPARATUS AND METHOD OF USING PMT HAVING WRAP-AROUND CIRCUITRY

[75] Inventors: Steve Meddaugh, Hamilton Square; Mehrzad Mahdavi, North Brunswick; Stefan Vajda, Belle Mead, all of N.J.

[73] Assignee: Schlumberger Technology Corporation, Ridgefield, Conn.

[21] Appl. No.: 248,811

[22] Filed: May 24, 1994

[51] Int. Cl.⁶ .................................................. H01J 40/14
[52] U.S. Cl. .................................. 250/214 VT; 250/207; 313/103 R
[58] Field of Search .......................... 250/214 VT, 207; 313/103 R, 103 CM, 105 CM, 533, 534, 526

[56] References Cited

U.S. PATENT DOCUMENTS

| | | | |
|---|---|---|---|
| 4,376,246 | 3/1983 | Butterwick | 250/207 |
| 4,639,638 | 1/1987 | Purcell et al. | 313/534 |
| 4,642,735 | 2/1987 | Hodsdon et al. | 361/424 |
| 4,924,080 | 5/1990 | Caserta et al. | 250/214 VT |
| 5,118,925 | 6/1992 | Mims et al. | 250/214 VT |
| 5,191,517 | 3/1993 | Stephenson | 363/59 |

FOREIGN PATENT DOCUMENTS

| | | |
|---|---|---|
| 2190785A | 11/1987 | United Kingdom . |
| 2252157A | 7/1992 | United Kingdom . |

Primary Examiner—Edward P. Westin
Assistant Examiner—Stephen Calogeno
Attorney, Agent, or Firm—Leonard W. Pojunas

[57] ABSTRACT

A Cockcroft-Walton (CW) multiplying circuit is mounted to wrap around a cylindrical structure. A photomultiplier tube (PMT) has a photocathode which emits electrons and has dynodes connected to the CW multiplying circuit. The dynodes are biased to attract electrons from the photocathode. An electrical shield surrounds the PMT and the PMT nests within the shield. The cylindrical structure surrounds the shield and the shield nests within the cylindrical structure. The shield is a conductive material which electrically isolates the PMT from the CW multiplying circuit.

19 Claims, 5 Drawing Sheets

5,523,556

APPARATUS AND METHOD OF USING PMT HAVING WRAP-AROUND CIRCUITRY

FIELD OF THE INVENTION

The invention concerns a photomultiplier tube (PMT). More specifically, the invention concerns a photomultiplier tube nested within an electrical shield and power supply.

BACKGROUND OF THE INVENTION

Photomultiplier tubes are well known per se. Basically, a PMT is a tube which emits electrons when exposed to light or other radiation. A typical PMT includes a photocathode at one end of the tube, accelerating and focusing electrodes, a series of dynodes, and an anode. The photocathode at one end of the tube comprises a photoemissive material which ejects electrons in response to photons which hit the material. An associated power supply biases the accelerating and focusing electrodes more positively than the photocathode to accelerate the electrons away from the photoemissive material of the photocathode and axially through the tube. The power supply also biases the series of dynodes, one more positively than the last, to attract the accelerated electrons. As each electron hits an attracting dynode, the electron causes the dynode to eject one or more secondary electrons. The secondary electrons, in turn, are attracted to and hit the next dynode, ejecting still more electrons, creating a cascade effect. The cascade of electrons continue through the center of the tube toward the anode. The anode collects the electrons at the other end of the tube and produces a signal indicating the amount of light or other radiation to which the photoemissive material of the photocathode has been exposed. The multiplying effect of a PMT is evident from this example: a single electron hitting the first dynode can create a cascade of several thousand or even millions of secondary electrons at the anode. An example of a PMT is described in U.S. Pat. No. 4,639,638 to Purcell et al. for a Photomultiplier Dynode Coating Materials and Process, Issued Jan. 27, 1987.

FIG. 1a is a schematic diagram of a Photomultiplier Tube (PMT) 10 with one type of conventional power supply. The power supply 12 which biases the components of the PMT 10 can comprise an alternating current source 14 and a Cockcroft-Walton Circuit 16. This circuit 16 is known per se. The CW Circuit 16 comprises discrete elements, such as diodes 18 and capacitors 20, which are hard-wired in a ladder circuit. A first stage of the CW circuit 16 multiplies the voltage of the voltage source 14. Successive stages of the CW circuit 16 multiply the voltage of the preceding stage. Separate stages of the ladder comprising the CW Circuit 16 are connected to successive dynodes 22 of the PMT 10, for instance, to bias one dynode more positively than another in the direction of its anode 23. An example of a Cockcroft-Walton Circuit is described in U.S. Pat. No. 5,191,517 to Stephenson, for Electrostatic Particle Accelerator Having Linear Axial and Radial Fields, Issued Mar. 2, 1993, and assigned to the same assignee as this invention.

FIG. 1b is a schematic diagram of a Photomultiplier Tube (PMT) having conventional driving circuitry. In this case, the power supply comprises a voltage source 25 and a voltage dividing bleeder string 24. A bleeder string 24 comprising a series of resistors 26 connects to the PMT 10. Each resistor 26 of the bleeder string 24 is connected to bias an adjacent accelerator stage of the PMT 10.

Typically, the power supply, such as a CW Circuit 16, is assembled to the PMT 10 in a linear arrangement. Specifically, one end of the ladder comprising the CW Circuit 16 is secured to the anode-end of a PMT, such that longitudinal axes of the CW circuit 16 and of the PMT 10 are aligned. This arrangement results in a rather narrow PMT assembly. However, this arrangement is relatively long. The resulting length consumes valuable space in a well logging tool, for example.

Many companies provide photomultiplier tubes (PMTs) with miniature high voltage bases however they are not designed for the rigorous environmental demands of oil well-logging. This is because the high voltage power which drives the PMT is connected to the PMT using a multiholed socket and mate, or pin-and-header arrangement, which is fragile at best. Such high voltage devices available on the market utilize an end-to-end, linear Cockcroft-Walton (CW) ladder which delivers voltages to each stage of the PMT.

One application of a PMT is well-logging. Typically, the PMT and a radiation source are carded on a skid of a logging tool. High voltage power supplies, carded by the tool, connect to the PMT on the skid. The PMT's are mounted on the skid to be closer to the radiation source, which in turn produces better statistics and a faster log of the borehole. The power supplies are mounted in the tool itself to minimize skid length, which in turn reduces displacement of the skid off the mudwall of the borehole at deviations or wash-outs. After the logging tool is lowered into a borehole, the skid is extended from the tool to engage the mudwall of the borehole. The radiation source generates radiant energy into the earth formation surrounding the borehole, and the PMT detects returning radiation as the logging tool is winched up the borehole. The PMT produces an output in response to the detected radiation, which is interpreted to indicate characteristics of the earth formation.

The Micro-Channel Plate (MCP) detector has the same general purpose as the PMT, that is optical radiation detection. However, the MCP and PMT have different operating parameters and different applications. For example, the MCP is count-rate limited compared to the PMT, which is unacceptable in well-logging applications. The MCP needs only 3 high voltage outputs. One voltage is for the plates of the MCP. The plates supply a fairly hefty current, approximately 30 micro amps at 3–4 kV, typically using a 3 stage Cockcroft-Walton (CW) ladder to accomplish this. A second voltage biases the anode or phosphor of the MCP. If for an anode, only a few hundred volts are needed. If for a phosphor, a few thousand volts (sometimes 5 KV) may be needed usually with a 3 stage CW ladder. Typically, the power needed for this supply is small. A third voltage biases the cathode of the MCP. This voltage only has to provide a few hundred volts which are floating on top of the plate supply. Typically this supply is a simple rectifier. Even lower power is needed for the third supply than the second.

SUMMARY OF THE INVENTION

The invention concerns an apparatus comprising a means for detecting radiation having at least one dynode. The apparatus also comprises a means for electrically biasing the means for detecting radiation, and for substantially physically surrounding the means for detecting radiation. The apparatus also comprises a means for electrically isolating the means for detecting radiation from the means for electrically biasing and for substantially physically surrounding the means for detecting radiation.

The invention also concerns an apparatus comprising a structure and a multiplying circuit mounted on the structure. A voltage supply is connected to produce a first voltage to the multiplying circuit such that the multiplying circuit multiplies the first voltage to a second voltage. The apparatus also comprises a discrete dynode vacuum tube (DVT) having a photocathode which emits electrons. The DVT also has at least one dynode connected to the multiplying circuit such that the dynode is biased to attract electrons from the photocathode. In addition, an electrical shield substantially surrounds the DVT such that the DVT nests within the shield. The structure substantially surrounds the shield such that the shield nests within the structure. The shield electrically isolates the DVT from the multiplying circuit.

The invention also concerns a method for detecting radiation. The steps comprise supplying a first voltage from a power supply to a multiplying circuit mounted on a structure, multiplying the first voltage to a second voltage with the multiplying circuit, and emitting electrons from a photocathode of a discrete dynode vacuum tube (DVT) in response to detected radiation. The DVT has at least one dynode connected to the multiplying circuit. The steps also include biasing the dynode with the second voltage of the multiplying circuit to attract electrons from the photocathode, substantially surrounding the DVT with an electrical shield and nesting the DVT within the shield, substantially surrounding the shield with the structure and nesting the shield within the structure. The steps further include electrically shielding the DVT from the multiplying circuit with the shield and producing a signal at the anode of the DVT to indicate detected radiation.

The technique of this invention provides low power consumption, high current output linearity, and small size of the power supply itself. These advantages benefit well logging and other applications by providing higher counting rate logs, shorter detector spacings, elimination of high voltage wiring within the logging tool, and shorter tools. Use of the invention in logging application results in a faster, more accurate log.

DETAILED DESCRIPTION OF THE PREFERRED EMBODIMENTS

One embodiment of this invention concerns a miniature wrap-around Cockcroft-Walton high voltage power supply, which is wired to a photomultiplier tube. The preferred embodiment of this invention provides 14 outputs with a 14-stage Cockcroft-Walton ladder. The power required at each output increases toward the last dynode where it is needed the most. When no light is falling onto the detector, the power supply of this invention does not supply any current to the sensor, resulting in a power savings. Conversely, the MCP supply (or similarly powered PMT) still needs to power its bleeder string even when no light falls on its detector.

To produce the smallest possible detector, the invention uses the available space not only in the rear of the PMT but also around the body of the PMT. The arrangement of this invention has a clear advantage over the linearly arranged, high voltage supplies available for PMT's on the market. The arrangement of this invention locates the high voltage ladder around the body of the PMT in a wrap-around configuration, and utilizes radial space efficiently.

Figure 1A:
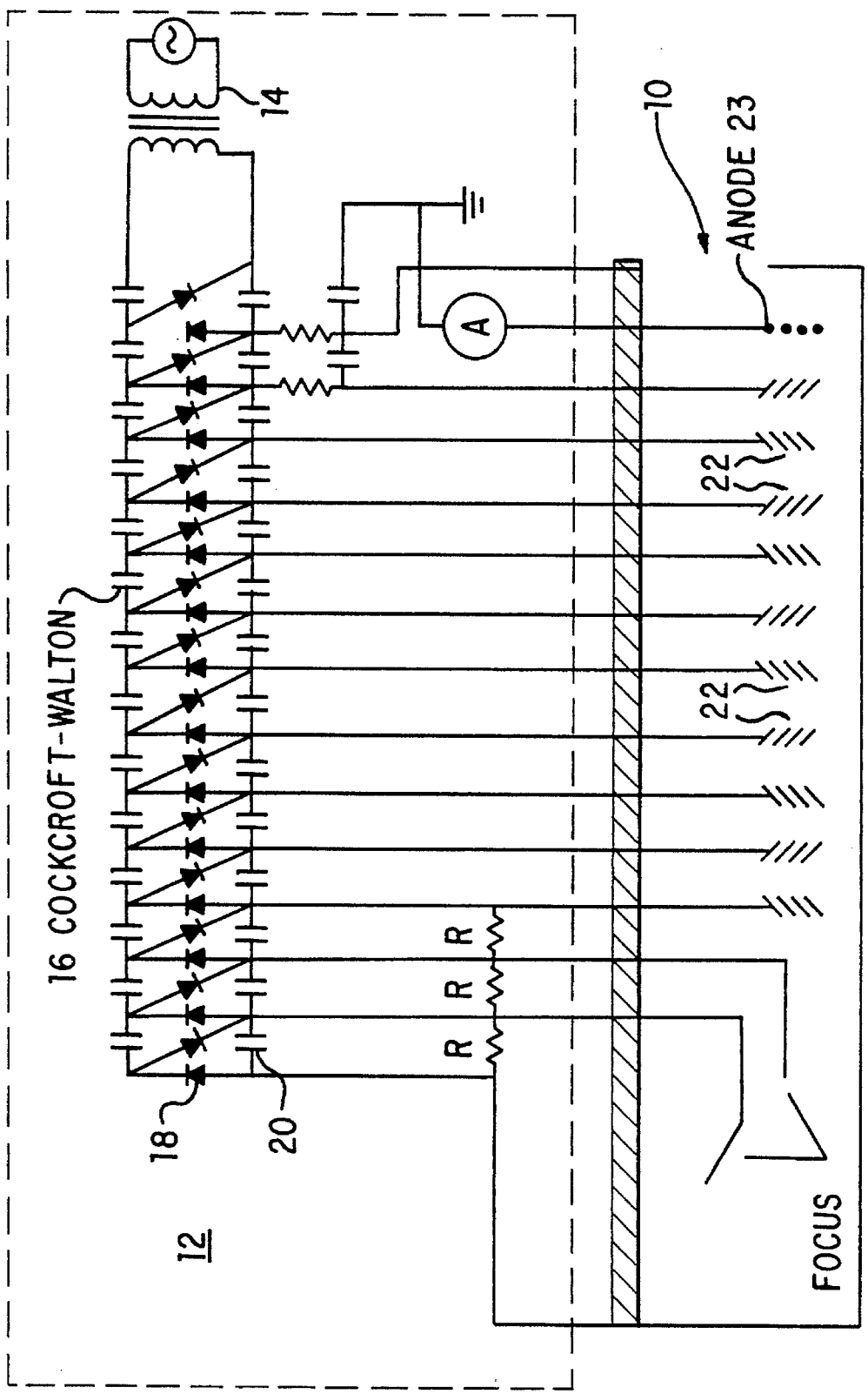
FIG. 1a and 1b are schematic diagrams of a Photomultiplier Tube (PMT) with a conventional power supply.
Figure 1B:
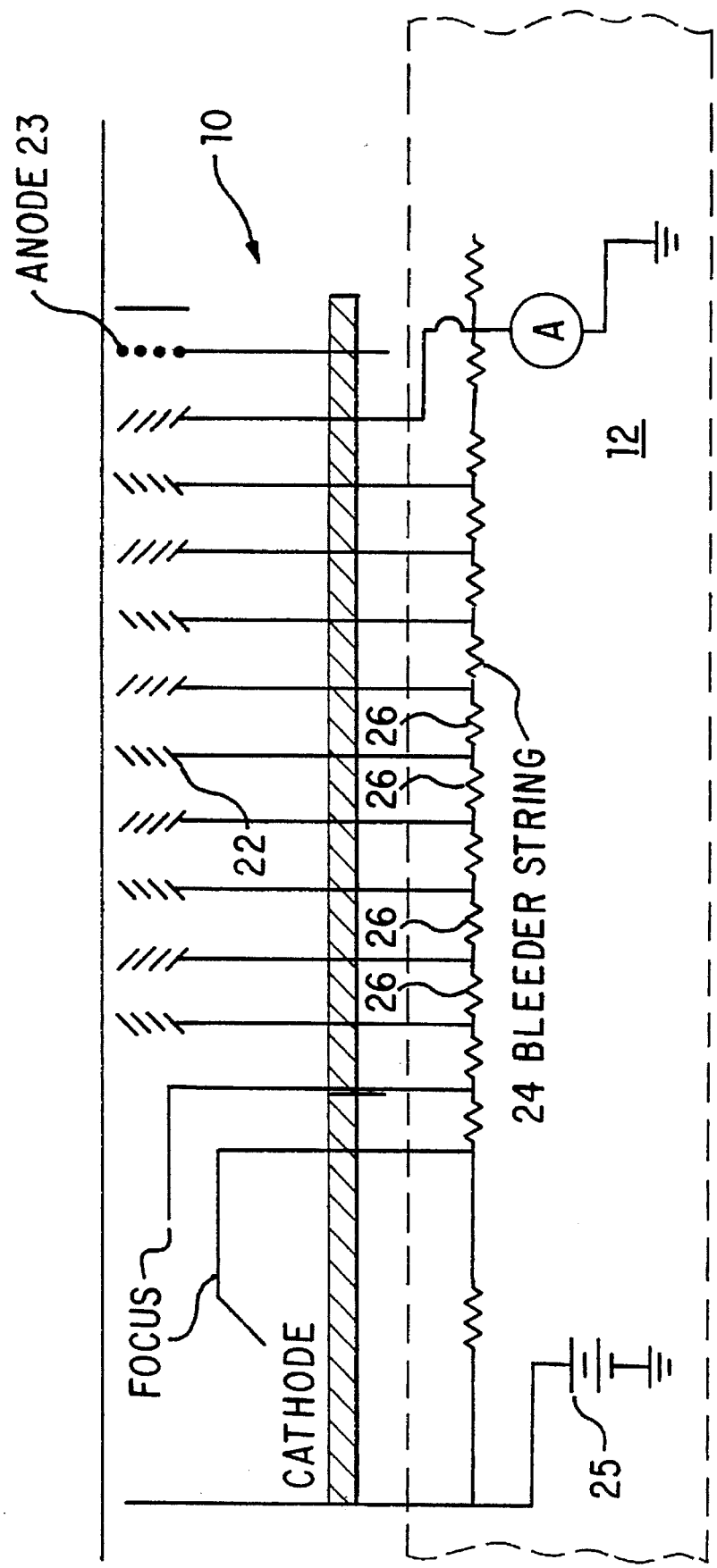
Figure 2A:
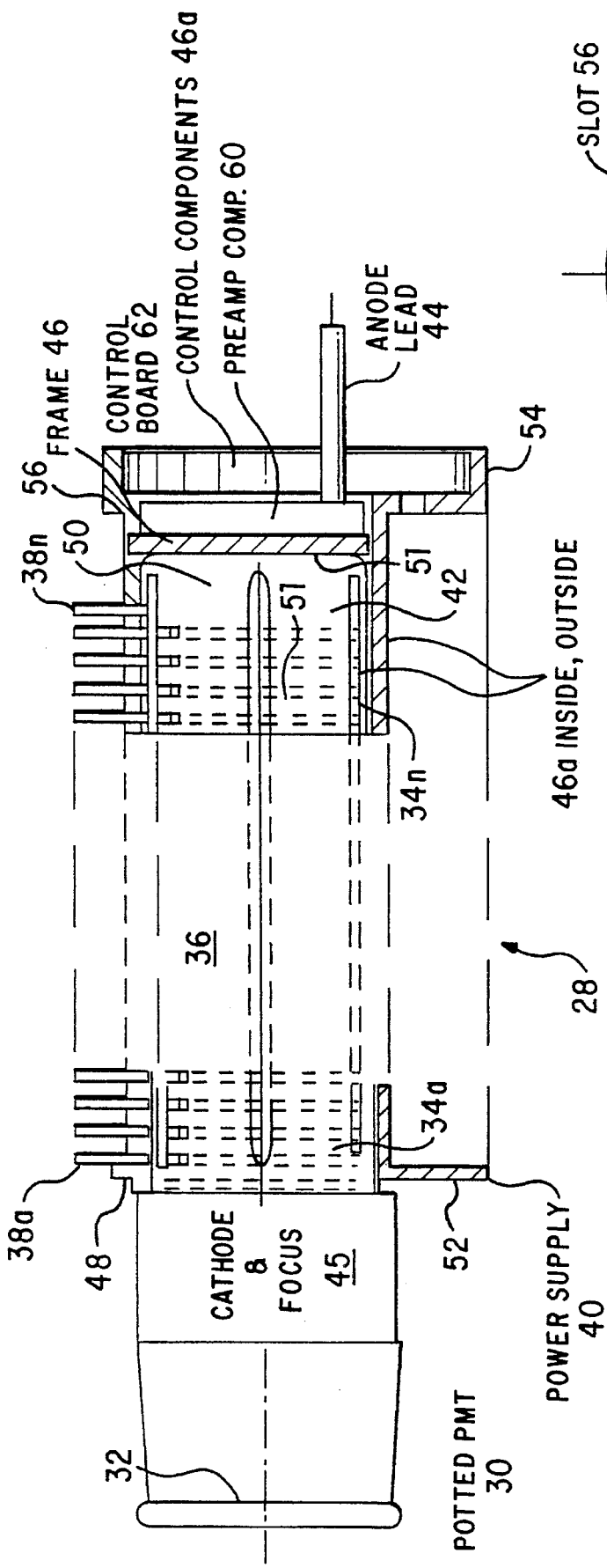
FIG. 2a and 2b illustrate side and end views of the wrap-around PMT of this invention.
Figure 2B:
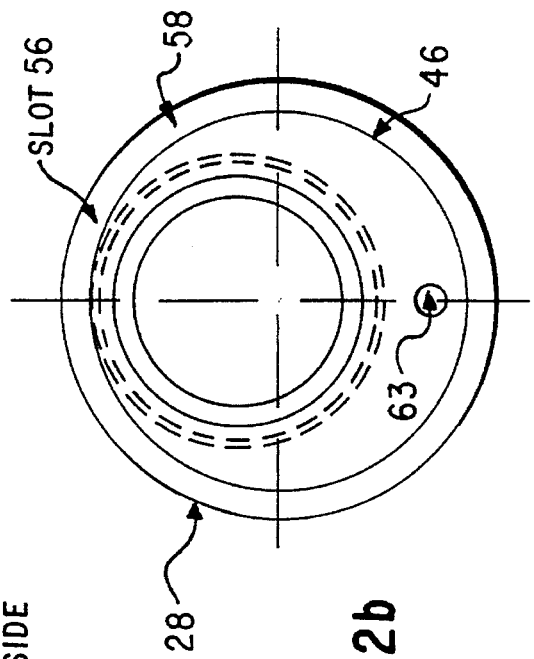

FIGS. 2a and 2b illustrate side and end views of the wrap-around discrete dynode vacuum tube, such as a PMT 30 of this invention. The PMT 30 includes a screen of photoemissive material 32. In response to radiation, such as photons, hitting the photoemissive material 32, the material ejects electrons. The PMT 30 includes a cathode and focusing elements, biased to guide the ejected electrons. The electrons are then attracted from the photoemissive material toward dynodes 34 of the PMT accelerator 36. Each dynode 34 of the accelerator 36 connects through a corresponding lead 38 to a corresponding stage of a power supply 40, discussed below. In this manner, each dynode 34 is successively biased with an increasingly higher voltage to attract electrons in an avalanching effect. An anode 42 collects the electrons and produces an output signal at the anode lead 44. This output signal indicates the level of radiation detected by the PMT 30.

However, the resulting close proximity of these electrically noisy components to the anode 42 of the PMT 30, results in a problem. Specifically, the anode 42 is subject to electrical pickup of an oscillator and chopping field effect transistors (FET's) (not shown) of the power supply 40. To address this problem, a conductive frame 46 is located between the PMT 30 and these high voltage power supply components. The frame 46 serves as an electrical shield for isolating the PMT, as a mold for supporting a high voltage power supply board and as a structural housing supporting the associated high voltage control components. The frame 46 can comprise aluminum, brass, or bronze, for example, or other conducting material.

The generally cylindrical conductive frame 46 substantially surrounds the PMT 30. The conductive frame 46 is opened at one end 48 and closed at the other end 50. The closed end 50 comprises a disk of conductive material which is force-fitted into a tube of that material and soldered in place to form the conductive frame 46. This shape allows the PMT 30 to nest within the conductive frame 46, once the PMT 30 is inserted into the open end 48 of the conductive frame 46.

The conductive frame 46 includes two flanges 52, 54, which are shaped from the tube of conductive material. The flanges 52, 54 define a compartment for housing the power supply 40. The conductive frame 46 includes an axial slot 56 which extends along the longitudinal direction of the frame 46 in its circumferential surface. The slot 56 extends lengthwise along the frame 46 from the location of the first dynode 34a to the last dynode 34n. The inside and outside of the conductive frame are coated with a polyimide 46a to prevent arcing between the components and the frame. Polyimide is available from DuPont under the trade name "Kapton."

Each dynode 34 is typically spot welded or brazed across a ring of copper or beryllium comprising a stage of the accelerator 36. As each electron hits the dynode 34, more electrons are released by that dynode. This results in a cascade process which multiplies the number of electrons within the PMT. The leads 38 extend from their corresponding dynodes 34 through the slot 56 of the conductive frame 46, and connect with stages of the power supply 40.

The power supply 40 comprises a transformer, oscillator, and a CW ladder (not shown). The transformer, oscillator, and high voltage ladder are electrically like those of a linearly arranged PMT. However, the oscillator and transformer are mounted in the compartment of the conductive frame 46 between the flanges 52, 54 of that frame. The CW ladder is also mounted in the compartment between the flanges 52, 54 of that frame. However, the CW ladder is mounted on a circuit board which bends to conform to and mount within the outer circumference 58 of the conductive frame 46. See FIG. 2b. In this manner, the power supply 40 substantially surrounds the conductive frame 46. The CW ladder, in this embodiment, wraps annularly around the PMT 30.

The conductive frame 46 also includes a section which houses components of a preamplifier 60. The preamplifier components 60 are mounted to one side of a circular control board 62, for example. The preamplifier components 60 amplify the signal traveling from the anode 42, which represents the amount of radiation detected by the PMT 30. The preamplifier is typical of a PMT though its mounting is unique. The preamplifier collects electrons from the anode, then amplifies and generates a signal indicating detected photons.

Control components 64 are mounted to the opposite side of the control board 62, and within a recess of the conductive frame 46. The low voltage, control components 64 are typical for controlling a high voltage supply for use with a PMT, though their arrangement is unique to this invention. Such low voltage, control components 64 maintain the constant voltage levels of the power supply 40, for example.

The circular control board 62 is held in place in the conductive frame by a threaded retaining ring, not shown. The retaining ring is held onto the frame 46 by complimentary threads on the inside of the conductive frame, for example. The connection between the control board 62 and the oscillator of the power supply 40 is made through a hole 63 less than 1/8" in diameter between the 2 compartments. See FIG. 2b. The resulting package has an outside diameter of less than 1 inch, if necessary.

FIG. 2b shows an end view of the conductive frame 46. The frame 46 is viewed from the right end of FIG. 2a. As is evident, the longitudinal axis of the conductive frame 46 is not necessarily coaxial with the longitudinal axis of the PMT 30. In the preferred embodiment, the section of the conductive frame 46 for receiving the PMT 30 is offset toward the slot 56 of the conductive frame 46, relative to the recess for receiving the control components 64.

Figure 3:
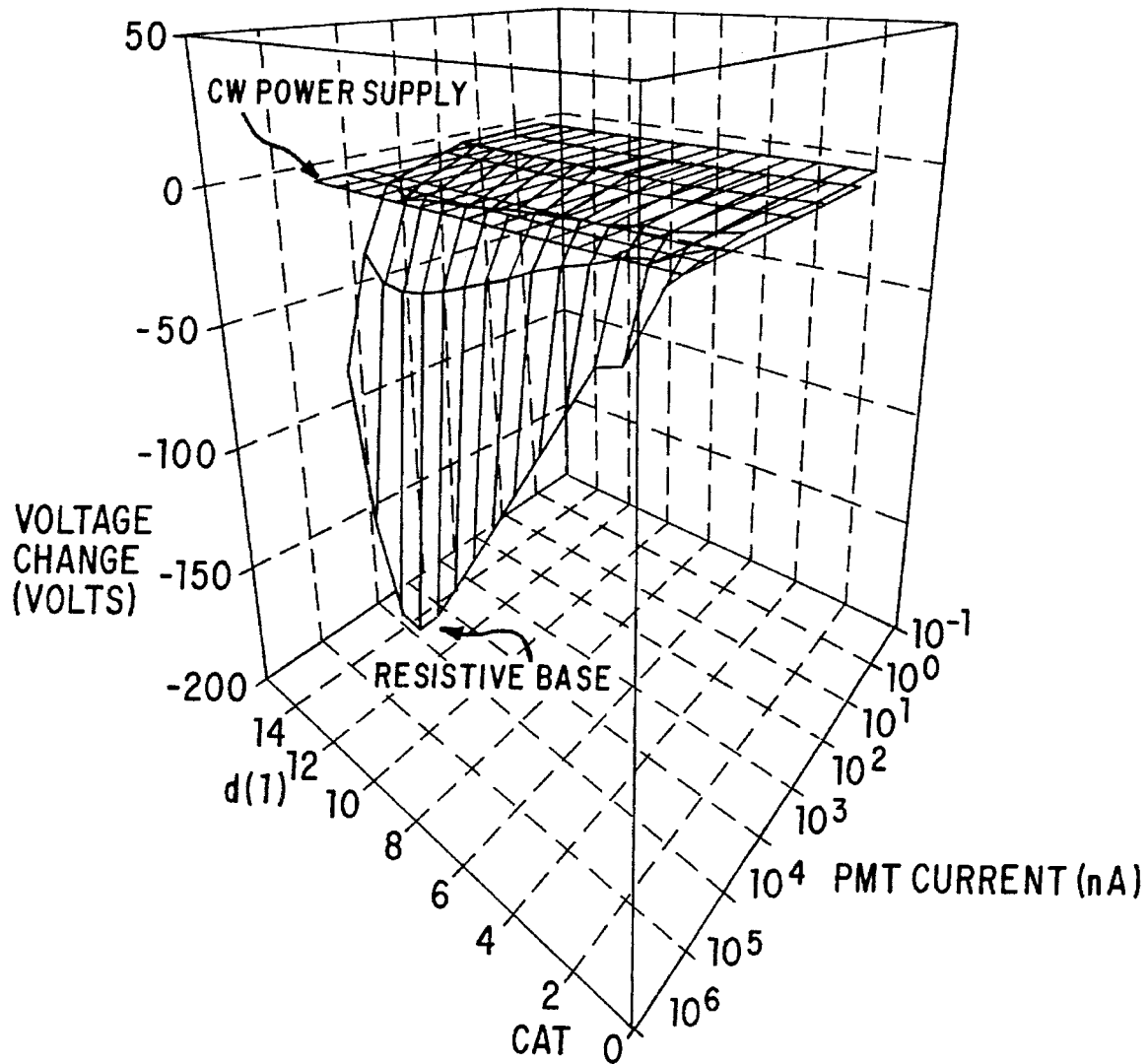
FIG. 3 illustrates voltage sag of Cockcroft-Walton supply and resistive bleeder string biasing network.

FIG. 3 illustrates voltage sag of Cockcroft-Walton power supply and bleeder string biasing network. To illustrate the operational advantage of this type of high voltage power supply over a conventional single output power supply with a bleeder string a linearity test was performed. A bleeder string is a series of resistors, each connected to bias adjacent stages of an accelerator. FIG. 3 illustrates that the conventional CW power supply with a 55.6 M-ohm bleeder, although it's primary high voltage does not change, suffers from voltage sagging in the last few dynode stages. This is because the resistive bleeder can not supply the current demanded by each of the lower stages, the last stages drawing larger currents. The result is that the voltage between each stage is redistributed between all of the stages of the PMT changing the gain of the device drastically. The voltage is redistributed between the other stages to compensate for sagging voltages at the last few stages. Thus, when each stage of the PMT is driven in effect by it's own separate power supply as in the case of the wraparound supply of this invention, none of the stages experience voltage sag. As a result, the device remains linear over a much higher range of anode currents. This can be seen in FIG. 4.

Figure 4:
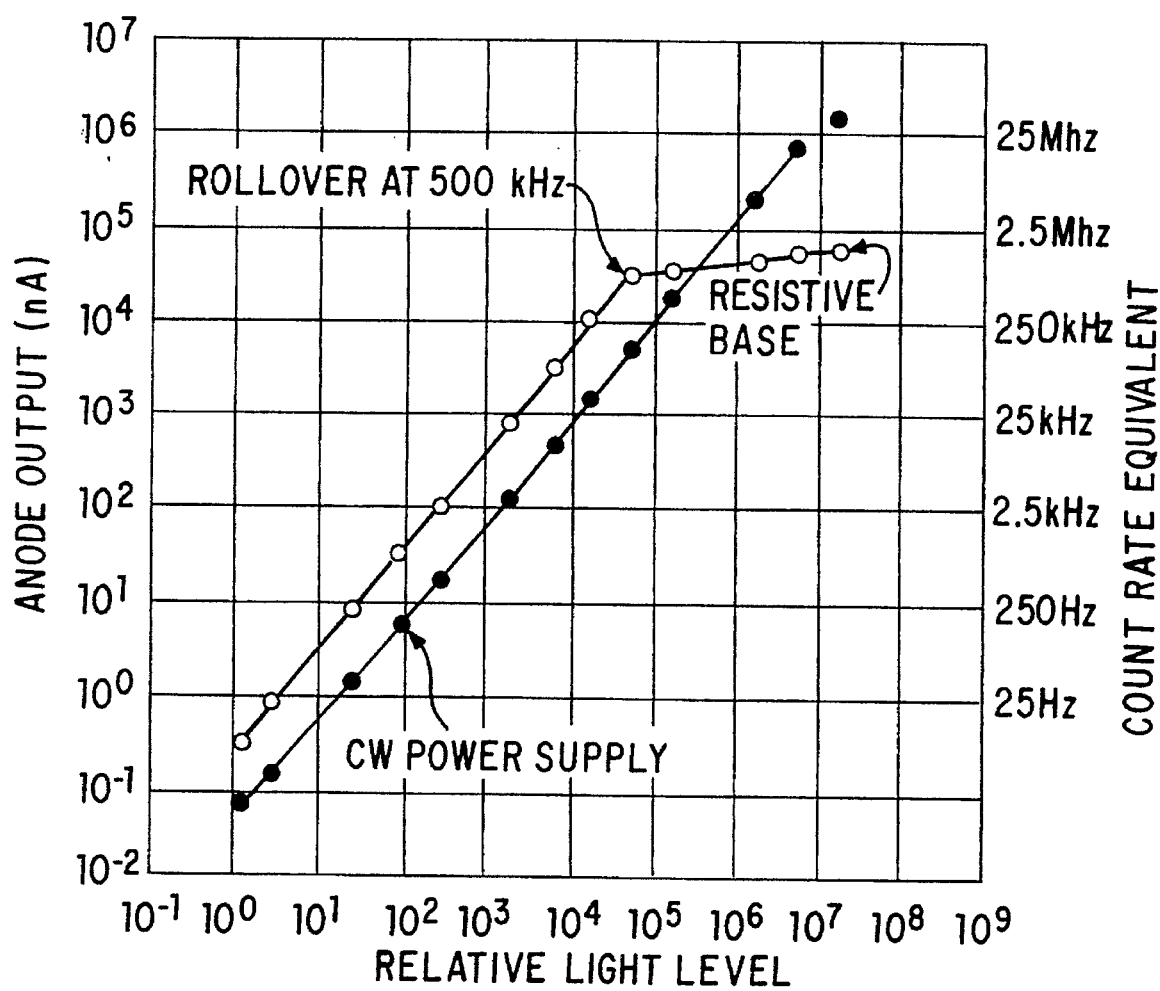
FIG. 4 illustrates anode output as a function of light input for the PMT of this invention and for a conventional PMT having a resistive bleeder string.

FIG. 4 illustrates anode output as a function of light input for the PMT of this invention and for a convention PMT having a resistive bleeder string. As is evident from FIG. 4, the output of the bleeder string loses linearity above $10^4$nA. The output of this invention continues linearly well above $10^5$nA.

Because the high voltage supply 40 is located near the anode 42 of the PMT 30 extreme care is needed to ensure that ripple in the last 2 stages of the power supply 40 is minimized. Ripple results from the AC component of the DC signal of the power supply, and is caused by the components used in the device. The ripple requirement for the power supply is very tight, especially near the anode. This is because the output next to the anode of the PMT is capacitively coupled to the anode. Any excess ripple on these lines would corrupt the output signal. The anode can be a last, solid dynode which collects the electrons.

Reduction of this tipple effect can be accomplished in a number of ways. The easiest way is to use larger capacitors or an RC filter in the last 2 stages of the CW power supply. A supplemental method is to inject a complimentary signal into the anode that is out of phase with the ripple of the power supply canceling its effects. This can be accomplished using the same signal, but shifted 180°. The anode lead was terminated into 50 ohms to match the preamp input termination of be the detector preamplifier.

We claim:

1. An apparatus comprising:

a structure;

a multiplying ladder circuit having stages and mounted on the structure;

a voltage supply connected to produce a first voltage to the multiplying circuit such that the multiplying circuit multiplies the first voltage to a second voltage;

a discrete dynode vacuum tube (DVT) having a photocathode which emits electrons and having a plurality of dynodes connected to the multiplying circuit such that the dynodes are biased to attract electrons from the photocathode, the dynodes having corresponding leads extending from the vacuum tube;

a substantially tubular electrical shield substantially surrounding the DVT such that the DVT nests within the shield and the multiplying circuit wraps annularly around the shield, the shield having a lengthwise slot through which the leads extend and connect to the stages of the multiplying circuit, the shield also having one open end for accepting the vacuum tube and a closed end; further wherein the structure substantially surrounds the shield such that the shield nests within the structure, and the shield electrically isolates the DVT from the multiplying circuit; and control circuitry mounted at the closed end of the shield such that the shield comprises a means for electrically isolating the vacuum tube from the control circuitry.

2. The apparatus of claim 1, wherein the vacuum tube comprises a photomultiplier tube.

3. The apparatus of claim 2, wherein the ladder circuit comprises a Cockcroft-Walton multiplying circuit.

4. The apparatus of claim 1, wherein the shield comprises a conductive frame having a polyimide coating.

5. An apparatus comprising:

a housing;

a multiplying ladder circuit having stages and mounted in the housing;

a voltage supply connected to produce a first voltage to the multiplying circuit such that the multiplying circuit multiplies the first voltage to a second voltage;

a discrete dynode vacuum tube (DVT) within the housing and having a photocathode which emits electrons and having at least one dynode connected to the multiplying circuit such that the dynode is biased to attract electrons from the photocathode;

a substantially tubular electrical shield within the housing and positioned such that the DVT nests within the shield and the shield nests within the multiplying circuit to electrically isolate the DVT from the multiplying circuit.

6. The apparatus of claim 5, comprising control circuitry mounted within the housing such that the shield electrically isolates the DVT from the control circuitry, and wherein the vacuum tube comprises a photomultiplier tube.

7. The apparatus of claim 6, wherein the multiplying circuit comprises a Cockcroft-Walton circuit wrapped around the photomultiplier tube.

8. The apparatus of claim 7, wherein the shield comprises a conductive frame having a polyimide coating.

9. The apparatus of claim 8, wherein the vacuum tube includes a plurality of dynodes, the dynodes having corresponding leads extending from the vacuum tube, the shield having a lengthwise slot through which the leads extend, the multiplying circuit comprising a ladder circuit having stages which connect to the extended leads of the dynodes.

10. An apparatus comprising:

a structure;

a Cockcroft-Walton multiplying ladder circuit having stages and mounted on the structure;

a voltage supply connected to produce a first voltage to the multiplying circuit such that the multiplying circuit multiplies the first voltage to a second voltage;

a photomultiplier tube (PMT) having a photocathode which emits electrons and having at least one dynode connected to the Cockcroft-Walton circuit such that the dynode is biased to attract electrons from the photocathode, the dynode having a lead extending to connect to stages of the Cockcroft-Walton circuit;

a substantially tubular electrical shield substantially surrounding the PMT such that the PMT nests within the shield and the Cockcroft-Walton circuit wraps annularly around the shield, the shield also having one open end for accepting the PMT and a closed end; further wherein the structure substantially surrounds the shield such that the shield nests within the structure, and the shield electrically isolates the PMT from the Cockcroft-Walton circuit; and control circuitry mounted at the closed end of the shield such that the shield electrically isolates the vacuum tube from the control circuitry.

11. The apparatus of claim 10, wherein the shield comprises a conductive frame having a polyimide coating.

12. The apparatus of claim 11, wherein the PMT includes a plurality of dynodes, the dynodes having corresponding leads extending from the PMT, the shield having a lengthwise slot through which the leads extend, the Cockcroft-Walton circuit having stages which connect to the extended leads of the dynodes.

13. A method for detecting radiation, the steps comprising:

a) supplying a first voltage from a power supply to a multiplying ladder circuit within a housing;

b) multiplying the first voltage to a different voltages with the multiplying circuit;

c) emitting electrons from a photocathode of a discrete dynode vacuum tube (DVT) within the housing in response to detected radiation, the DVT having dynodes connected to the multiplying circuit and which are biased with the different voltages of the multiplying circuit to attract electrons from the photocathode;

d) electrically shielding the DVT from the multiplying circuit with a tubular electrical shield nested between the DVT and the multiplying circuit, the shield also being within the housing; and e) producing a signal from the DVT to indicate detected radiation.

14. The method of claim 13, including emitting electrons from a DVT comprising a photomultiplier tube.

15. The method of claim 14, including providing sequentially higher voltages to the dynodes from corresponding stages of the multiplying circuit.

16. The method of claim 15, including carrying the DVT in a logging tool and detecting radiation in a borehole in an earth formation with the logging tool to indicate a characteristic of the earth formation based on the detected radiation.

17. The method of claim 16 including using a radiation source in the logging tool to produce radiation in the formation.

18. The method of claim 17 including shielding the photomultiplier tube comprising the DVT with an electrical shield comprising a conductive frame.

19. The method of claim 18 including biasing the dynodes with a multiplying circuit comprising a Cockcroft-Walton.

* * * * *